(12) United States Patent
Komaji et al.

(10) Patent No.: US 11,254,365 B2
(45) Date of Patent: Feb. 22, 2022

(54) SIDE VEHICLE-BODY STRUCTURE OF VEHICLE

(71) Applicant: MAZDA MOTOR CORPORATION, Hiroshima (JP)

(72) Inventors: Tomohiro Komaji, Aki-gun (JP); Yoshihiko Horita, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/995,632

(22) Filed: Aug. 17, 2020

(65) Prior Publication Data

US 2021/0061363 A1    Mar. 4, 2021

(30) Foreign Application Priority Data

Aug. 26, 2019 (JP) .............................. JP2019-153786

(51) Int. Cl.
*B62D 25/04* (2006.01)
*B60J 5/04* (2006.01)
*B62D 27/02* (2006.01)

(52) U.S. Cl.
CPC .............. *B62D 25/04* (2013.01); *B60J 5/045* (2013.01); *B62D 27/02* (2013.01)

(58) Field of Classification Search
CPC ......... B62D 25/04; B60J 5/043; B60J 5/0479; B60J 5/0429; B60J 5/0433

USPC ................................... 296/202, 146.5, 146.6
See application file for complete search history.

(56) References Cited

U.S. PATENT DOCUMENTS

2003/0006625 A1    1/2003  Moriyama et al.
2011/0266836 A1*  11/2011  Heo ..................... B62D 21/157
                                                296/193.06

FOREIGN PATENT DOCUMENTS

JP      2003025844 A      1/2003
KR      200187477 Y1  *  7/2000

* cited by examiner

*Primary Examiner* — Dennis H Pedder
(74) *Attorney, Agent, or Firm* — Studebaker & Brackett PC (57) ABSTRACT

A side vehicle-body structure of a vehicle that suppresses displacement of a front wall portion of a center pillar to a vehicle-width-direction inner side with respect to a rear wall portion of the center pillar due to a side collision load. The side vehicle-body structure of the vehicle in which the center pillar does not exist on a body side includes a front door, and a rear door having a length in a front-rear direction shorter than a length of the front door in the front-rear direction. The rear door has a center pillar on a door side in a front portion, and a gusset member protruding from a rear wall portion of the center pillar to a door outer panel side with respect to an outer wall portion of the center pillar and having a receiving surface portion for a side collision load along the door outer panel.

18 Claims, 6 Drawing Sheets

SIDE VEHICLE-BODY STRUCTURE OF VEHICLE

BACKGROUND

Technical Field

The present disclosure relates to a side vehicle-body structure of a vehicle in which a center pillar connecting a roof side rail portion and a side sill portion to each other in the up-down direction does not exist on the body side.

Background Art

Conventional center-pillar-less vehicles have no body-side center pillar connecting a roof side rail and a side sill to each other in the up-down direction on the vehicle body side. Therefore, the door-side center pillar is built in a front end of a rear door, and load received by the door-side center pillar is transmitted to the vehicle body side at both of upper and lower end portions thereof at the time of a side collision. However, in general vehicles, the length of the rear door in the front-rear direction is shorter than the length of a front door in the front-rear direction due to design, and hence the center pillar is disposed so as to correspond to a place close to the rear side of a door opening.

Therefore, a behavior in which a front wall portion of the center pillar is greatly displaced to the vehicle-width-direction inner side with respect to a rear wall portion of the center pillar occurs due to a side collision load being slightly pressed against the front wall portion of the center pillar with respect to the rear wall portion of the center pillar at the time of a side collision of the vehicle. Thus, there has been room for improvement regarding structures for transmitting a load to a vehicle body on both of upper and lower ends of the door-side center pillar.

Incidentally, Japanese Patent Laid-Open No. 2003-25844 discloses a structure in which a center pillar is built in a rear door front portion in a vehicle including doors in a form of a clamshell door structure. An impact bar extending in the front-rear direction of the vehicle is extended between an outer wall portion of a lower portion of the center pillar and a reinforcement check provided on a rear end of a door inner panel.

However, the related-art structure disclosed in Japanese Patent Laid-Open No. 2003-25844 does not disclose how the behavior in which the front wall portion of the center pillar is greatly displaced to the vehicle-width-direction inner side with respect to the rear wall portion of the center pillar at the time of a side collision is suppressed at all.

SUMMARY

Thus, the present disclosure provides a side vehicle-body structure of a vehicle capable of suppressing a behavior in which a front wall portion of a center pillar is greatly displaced to the vehicle-width-direction inner side with respect to a rear wall portion of the center pillar due to a side collision load being slightly pressed against the front wall portion of the center pillar with respect to the rear wall portion of the center pillar at the time of a side collision.

A side vehicle-body structure of a vehicle according to the present disclosure is a side vehicle-body structure of a vehicle in which a center pillar does not exist on a body side. The side vehicle-body structure includes a front door, a rear door having a length in a front-rear direction shorter than a length of the front door in the front-rear direction, the rear door having a center pillar on a door side built in a front portion thereof, and a gusset member protruding from a rear wall portion of the center pillar to a rear door outer panel side with respect to an outer wall portion of the center pillar and having a receiving surface portion for a side collision load along the rear door outer panel.

According to the abovementioned configuration, the load can be transmitted to the rear wall portion side of the center pillar by the gusset member at the time of a side collision. As a result, a behavior in which the front wall portion of the center pillar is greatly displaced to the vehicle-width-direction inner side with respect to the rear wall portion of the center pillar due to the side collision load being slightly pressed against the front wall portion of the center pillar with respect to the rear wall portion of the center pillar at the time of a side collision can be suppressed.

In one embodiment of the present disclosure, the center pillar is formed such that a length of an upper portion side in the front-rear direction is shorter than a length of a lower portion side in the front-rear direction, the upper portion side has a reinforcement member that reinforces an upper portion of the center pillar provided thereon, the gusset member is disposed to be close to a lower side of the center pillar, and the reinforcement member has a rear end portion extended downward to a place in which the gusset member is disposed.

According to the abovementioned configuration, the rear end portion of the reinforcement member is extended downward to the place in which the gusset member is disposed. As a result, the tension force against the lower portion of the rear door by the gusset member increases as the reinforcement member is pushed to the indoor direction. In one embodiment of the present disclosure, a cutout portion for mounting a die molding sealing member that performs corner sealing with the front door is formed on a front portion of an upper end of the center pillar.

According to the abovementioned configuration, the abovementioned behavior is suppressed by the gusset member, and hence a case where the front portion of the upper end of the center pillar slips through the cutout portion to the indoor direction can be suppressed even when the cutout portion is formed. In one embodiment of the present disclosure, the gusset member has a free end on a distal end side.

According to the abovementioned configuration, both of weight saving of the gusset member and the reduction of the assembling time of the gusset member can be performed. In one embodiment of the present disclosure, the gusset member has a reinforcement bead formed thereon along an extending direction of the gusset member.

According to the abovementioned configuration, the rigidity of the gusset member in the extending direction thereof can be increased. In addition, when a load is transmitted to the rear wall portion side of the center pillar via the gusset member at the time of a side collision, the load transmission efficiency thereof can be improved. In one embodiment of the present disclosure, the receiving surface portion of the gusset member has an elastic member in abutment with an outer panel of the rear door provided thereon.

The elastic member may be set to be a urethane member. According to the abovementioned configuration, the tensile rigidity of the outer panel of the rear door can be secured.

According to the present disclosure, an effect in which the behavior in which the front wall portion of the center pillar is greatly displaced to the vehicle-width-direction inner side with respect to the rear wall portion of the center pillar due to the side collision load being slightly pressed against the front wall portion of the center pillar with respect to the rear wall portion of the center pillar at the time of a side collision can be suppressed is obtained.

DETAILED DESCRIPTION

Suppressing a behavior in which the front wall portion of the center pillar is greatly displaced to the vehicle-width-direction inner side with respect to the rear wall portion of the center pillar due to the side collision load being slightly pressed against the front wall portion of the center pillar with respect to the rear wall portion of the center pillar at the time of a side collision is achieved by a configuration of a side vehicle-body structure of a vehicle in which a center pillar does not exist on a body side. The side vehicle-body structure includes a front door, a rear door having a length in a front-rear direction shorter than a length of the front door in the front-rear direction, the rear door having a center pillar on a door side built in a front portion thereof, and a gusset member protruding from a rear wall portion of the center pillar to a rear door outer panel side with respect to an outer wall portion of the center pillar and having a receiving surface portion for a side collision load along the rear door outer panel.

Figure 1:
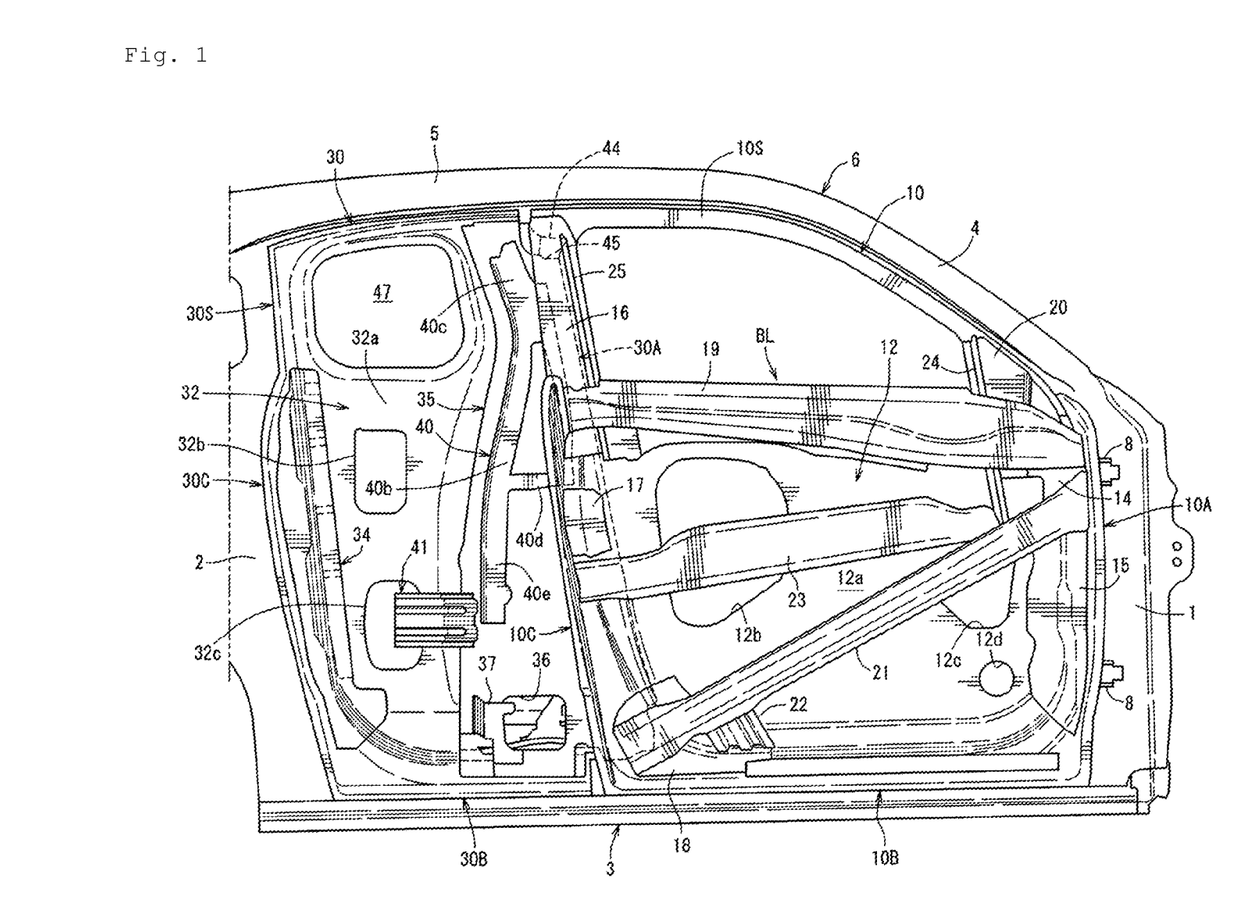
FIG. 1 is a side view illustrating a side vehicle-body structure of a vehicle of the present disclosure.
Figure 2:
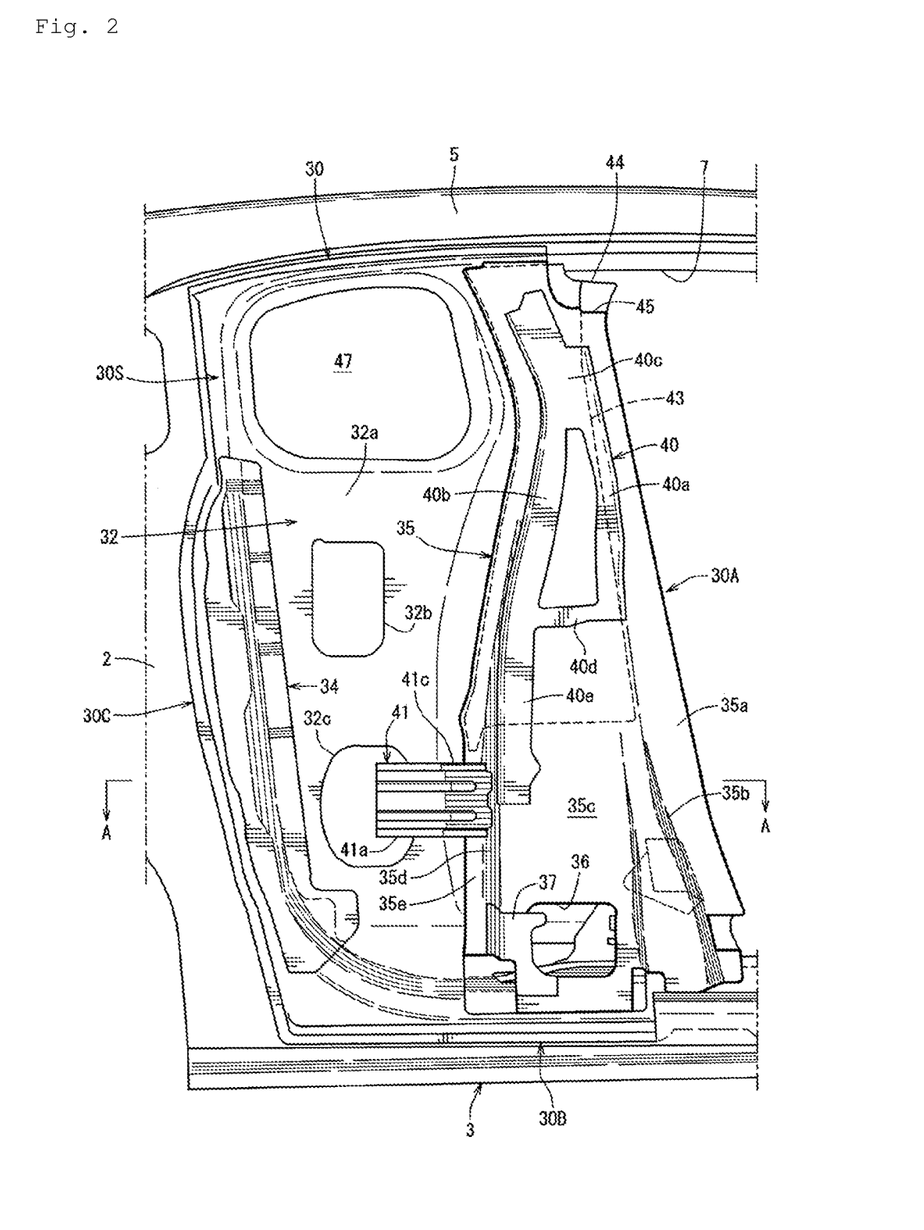
FIG. 2 is a main-part enlarged side view of FIG. 1.
Figure 3:
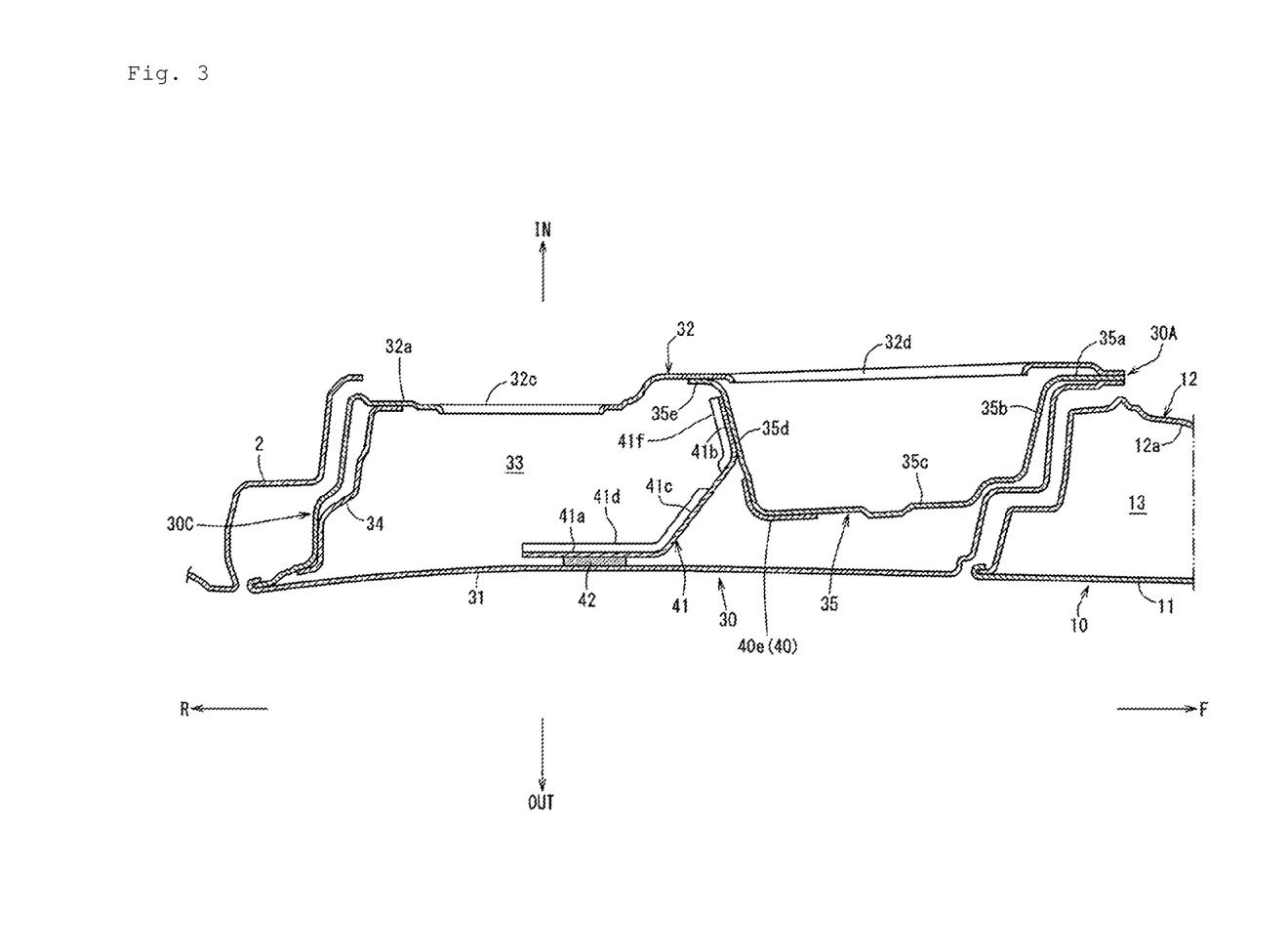
FIG. 3 is a cross-sectional arrow view taken along line A-A in FIG. 2.
Figure 4:
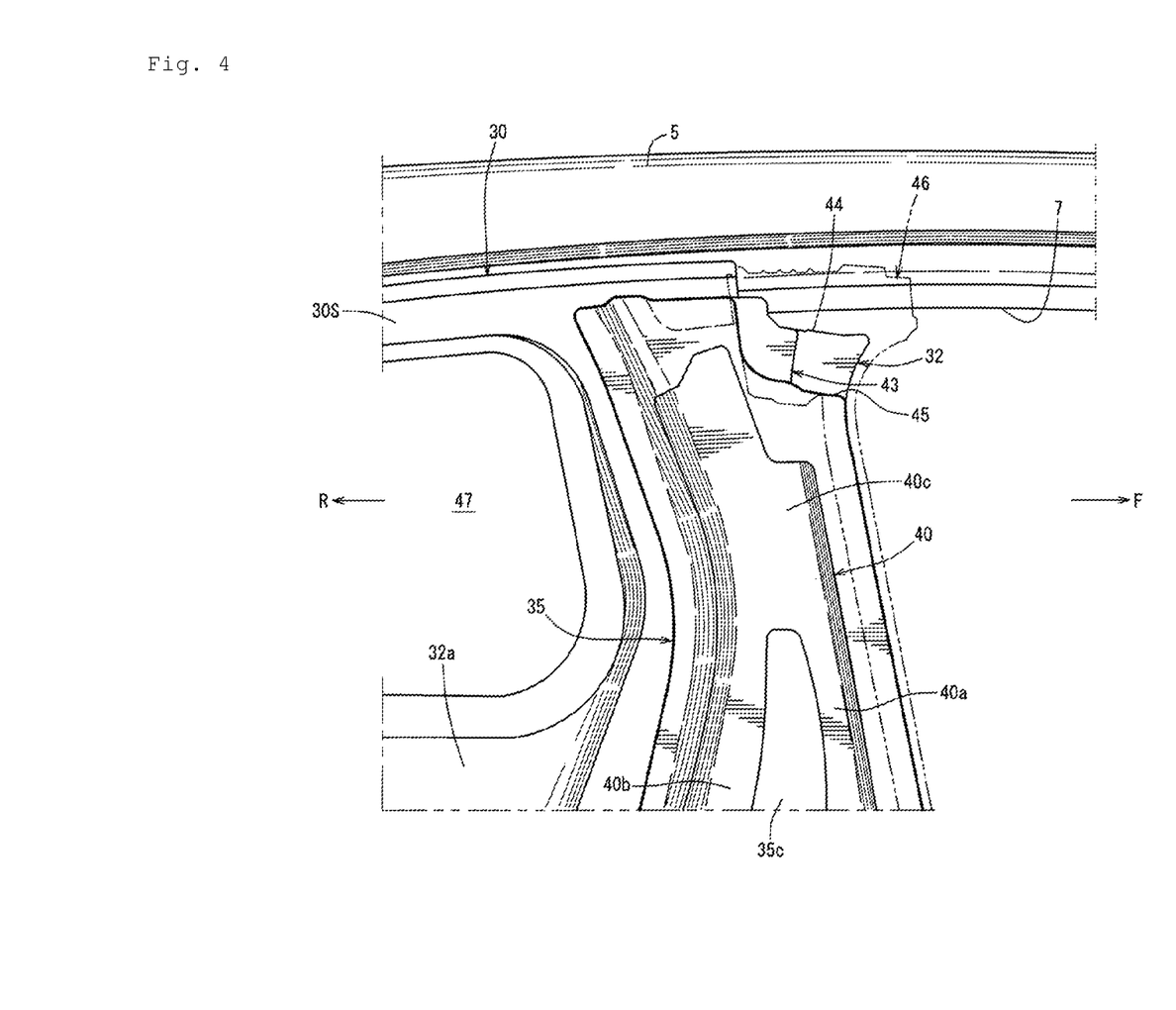
FIG. 4 is a partially-enlarged side view illustrating a structure of the periphery of an upper end portion of a door-side center pillar.
Figure 5:
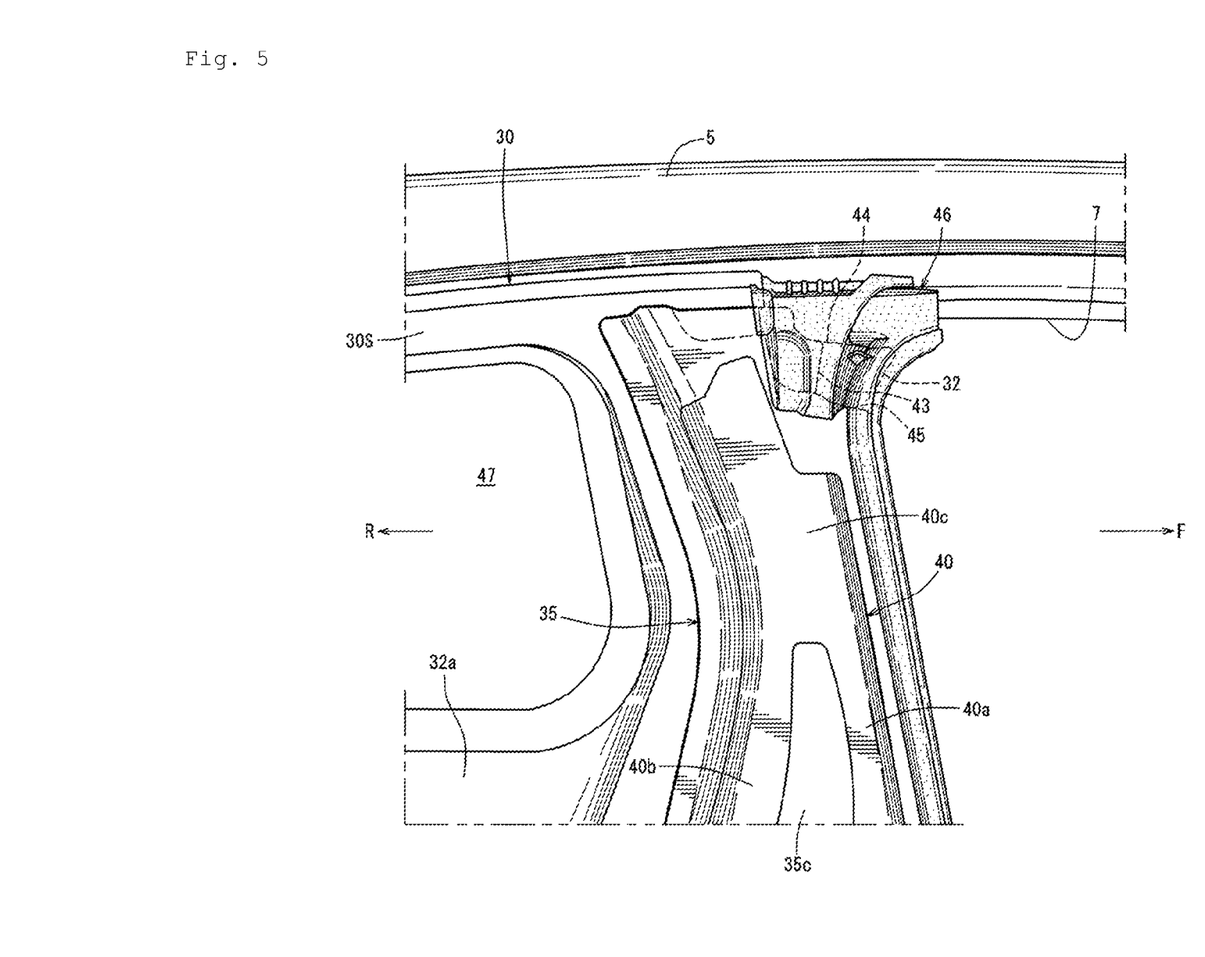
FIG. 5 is a partially-enlarged side view illustrating a state in which a die molding sealing member is mounted on a rear door front end portion.
Figure 6:
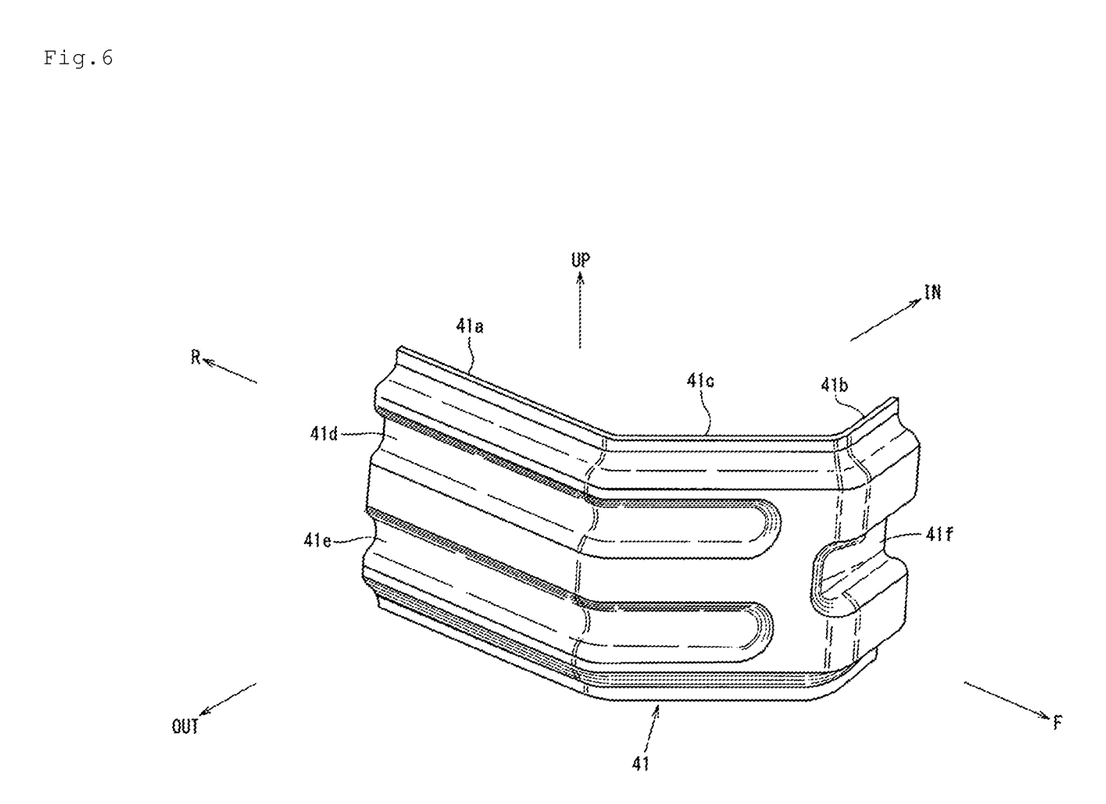
FIG. 6 is a perspective view illustrating a gusset member.

One embodiment of the present disclosure is described in detail with reference to the drawings below. The drawings illustrate a side vehicle-body structure of a vehicle. FIG. 1 is a side view illustrating the side vehicle-body structure of the vehicle in a state in which a door outer panel is removed and the side vehicle-body structure is seen from the vehicle-width-direction outer side, and FIG. 2 is a main-part enlarged side view of FIG. 1. FIG. 3 is a cross-sectional arrow view taken along line A-A in FIG. 2, FIG. 4 is a partially-enlarged side view illustrating a structure in the periphery of an upper end portion of a door-side center pillar, FIG. 5 is a partially-enlarged side view illustrating a state in which a die molding sealing member is mounted on a rear door front end portion, and FIG. 6 is a perspective view illustrating a gusset member.

As illustrated in FIG. 1, in a side portion on the body side, a hinge pillar portion 1 on the front side, a hinge pillar portion 2 on the rear side, a side sill portion 3, a front pillar portion 4, and a roof side rail portion 5 form an annular structure 6, and a center-pillar-less vehicle body in which a center pillar does not exist on the body side is formed. A door opening 7 (see FIG. 2) surrounded by the abovementioned portions, in other words, the hinge pillar portions 1 and 2, the side sill portion 3, the front pillar portion 4, and the roof side rail portion 5 is formed.

The hinge pillar portion 1 on the front side is a vehicle body rigid member having a hinge pillar closed cross-section extending in the vehicle up-down direction obtained by joining a hinge pillar outer and a hinge pillar inner to each other. The side sill portion 3 is a vehicle body rigid member connecting lower portions of the front and rear hinge pillar portions 1 and 2 to each other, and the side sill portion 3 has a side sill closed cross-section extending in the vehicle front-rear direction obtained by joining a side sill outer portion, a side sill inner portion, and a side sill reinforcement to each other.

The front pillar portion 4 is a vehicle body rigid member diagonally extending to the rear side and the upper side from a front portion to a rear portion thereof by connecting an upper end of the hinge pillar portion 1 on the front side and a front end of the roof side rail portion 5 to each other. The front pillar portion 4 has a diagonally-extending front pillar closed cross-section obtained by joining a front pillar outer and a front pillar inner to each other.

The roof side rail portion 5 is a vehicle body rigid member connecting a rear end of the front pillar portion 4 and a rear pillar portion front end (not shown) to each other in the vehicle front-rear direction. The roof side rail portion 5 has a roof side rail closed cross-section extending in the vehicle front-rear direction obtained by joining a roof side rail outer and a roof side rail inner to each other. As illustrated in FIG. 1 and FIG. 2, on the door opening 7 illustrated in FIG. 2, a front door 10 and a rear door 30 in the form of a clamshell door structure are provided.

The front door 10 is formed such that the rear side of the front door 10 opens and closes in a manner in which a door front end portion serves as a fulcrum via a pair of upper and lower hinge brackets 8, 8 provided on the hinge pillar portion 1. The rear door 30 is formed such that a front side of the rear door 30 opens and closes in a manner in which a door rear end portion serves as a fulcrum via a hinge bracket (not shown) provided on the hinge pillar portion 2 on the rear side. As illustrated in FIG. 3, the front door 10 and the rear door 30 in the form of a clamshell door structure are formed such that the front door 10 is opened in preference to the rear door 30.

As illustrated in FIG. 1 and FIG. 3, the front door 10 includes a door outer panel 11 made of a steel plate, and a door inner panel 12 made of a steel plate connected to the door outer panel 11 by a hemming process and the like, and a door panel is formed by both of the door outer panel 11 and the door inner panel 12.

The door outer panel 11 is disposed on the outside of the vehicle cabin to form a design surface of the front door 10. Meanwhile, the door inner panel 12 is disposed closer to the inside of the vehicle cabin than the door outer panel 11, and a door inner space 13 is formed between both of the door outer panel 11 and the door inner panel 12.

As illustrated in FIG. 1, the front door 10 includes a front edge portion 10A, a lower edge portion 10B, a rear edge portion 10C, a door sash portion 10S, and a beltline portion BL. At the front edge portion 10A, the door inner panel 12 is supported by the hinge pillar portion 1 on the vehicle body side in an openable and closable manner via the pair of upper and lower hinge brackets 8, 8.

At the front edge portion 10A of the front door 10, an upper hinge reinforcement 14 is provided on a place in the door inner panel 12 corresponding to the hinge bracket 8 on the upper side out of the pair of upper and lower hinge brackets 8, 8.

Similarly, at the front edge portion 10A of the front door 10, a lower hinge reinforcement 15 is provided on a place in the door inner panel 12 corresponding to the hinge bracket 8 on the lower side out of the pair of upper and lower hinge brackets 8, 8.

As illustrated in FIG. 1, a reinforcement 16 extending in the up-down direction from the door inner panel 12 at the upper side of the rear edge portion 10C of the front door 10 to a rear piece portion of the door sash portion 10S is provided. A latch reinforcement 17 is provided in a place in the door inner panel 12 at an up-down-direction intermediate portion of the rear edge portion 10C. A connecting reinforcement member 18 is provided from a lower portion of the rear edge portion 10C to a rear portion of the lower edge portion 10B in the door inner panel 12. In addition, as illustrated in FIG. 1, a beltline reinforcement 19 extending in the front-rear direction is provided along the beltline portion BL.

The beltline reinforcement 19 is extended between the upper hinge reinforcement 14 and a lower portion of the reinforcement 16. On the vehicle-width-direction inner side of the beltline reinforcement 19 and in a position corresponding to a door mirror (not shown) provided on the door outer panel 11, a bracket 20 also serving as a member for mounting the door mirror is provided.

As illustrated in FIG. 1, an impact bar 21 is mounted between the upper hinge reinforcement 14 positioned on the front side and the connecting reinforcement member 18 positioned on the rear side. The impact bar 21 is disposed so as to be inclined in a front-high rear-low shape such that a front portion is positioned on the upper side with respect to a rear portion in the up-down direction, and the impact bar 21 is for responding to a side collision.

As illustrated in FIG. 1, a reinforcement gusset member 22 connecting a rear portion of the impact bar 21 and the connecting reinforcement member 18 in the lower edge portion 10B of the front door 10 to each other is provided, and the reinforcement gusset member 22 is caused to function as a tension member.

As illustrated in FIG. 1, a stiffener 23 is provided that diagonally extends in the front-rear direction in a front-high rear-low shape, between a front portion of the beltline reinforcement 19 and a front portion of the impact bar 21, to the rear edge portion 10C directly below the latch reinforcement 17. The stiffener 23 is in abutment with the door outer panel 11 via a sponge member or a urethane material, and the tensile rigidity of the door outer panel 11 is secured by the stiffener 23.

As illustrated in the same drawing, glass guides 24 and 25 are mounted on both of the bracket 20 and the reinforcement 16. Window glass is guided to be raised and lowered along the pair of front and rear glass guides 24 and 25.

As illustrated in FIG. 1, the door inner panel 12 has a panel body 12a, and a plurality of openings 12b, 12c, and 12d for disposing a door module, a speaker, and the like are formed in the panel body 12a.

Next, the structure of the rear door 30 is described with reference to FIG. 1, FIG. 2, and FIG. 3. As illustrated in FIG. 1, the length of the rear door 30 in the front-rear direction is formed to be shorter than the length of the front door 10 in the front-rear direction.

As illustrated in FIG. 3, the rear door 30 includes a door outer panel 31 made of a steel plate, and a door inner panel 32 made of a steel plate connected to the door outer panel 31 by a hemming process or spot welding, and both of the door outer panel 31 and the door inner panel 32 form a door panel.

The door outer panel 31 is disposed on the outside of the vehicle cabin to form a design surface of the rear door 30. Meanwhile, the door inner panel 32 is disposed closer to the inside of the vehicle cabin than the door outer panel 31, and a door inner space 33 is formed between both of the door outer panel 31 and the door inner panel 32.

As illustrated in FIG. 1 and FIG. 2, the rear door 30 includes a front edge portion 30A, a lower edge portion 30B, a rear edge portion 30C, and a window frame portion 30S. At the rear edge portion 30C, the door inner panel 32 is supported by the hinge pillar portion 2 on the vehicle body side in an openable and closable manner via a pair of upper and lower hinge brackets (not shown).

As illustrated in FIG. 2 and FIG. 3, at the rear edge portion 30C, a hinge reinforcement 34 extending in the up-down direction is provided in the door inner panel 32. As illustrated in FIG. 2 and FIG. 3, a center pillar 35 (the same meaning as a vertical reinforcement) on the door side is built in a front portion of the rear door 30 such that a front end thereof is along the front edge portion 30A. The center pillar 35 is a pillar member extending in the up-down direction from a front upper-end portion of the window frame portion 30S to the lower edge portion 30B.

As illustrated in FIG. 3 as a cross-sectional view, the center pillar 35 is formed to have a hat-shaped profile in a horizontal cross-section by integrally forming a joining flange portion 35a on the front side, a front wall portion 35b, an outer wall portion 35c, a rear wall portion 35d, and a joining flange portion 35e on the rear side.

As illustrated in FIG. 2, the center pillar 35 is formed such that the length on the upper portion side in the front-rear direction is shorter than the length on the lower portion side in the front-rear direction, but the center pillar 35 is formed to have a cross-sectional hat-shaped profile from the upper portion side to the lower portion side except for both of upper and lower end portions thereof. As illustrated in FIG. 3, the front and rear joining flange portions 35a and 35e of the center pillar 35 extend in the front-rear direction, and each of the joining flange portions 35a and 35e is joined and fixed to the door inner panel 32.

The front wall portion 35b extends from a rear end of the joining flange portion 35a to the vehicle-width-direction outer side. Similarly, the rear wall portion 35d extends from a front end of the joining flange portion 35e to the vehicle-width-direction outer side. The outer wall portion 35c extends between vehicle-width-direction outer ends of the front wall portion 35b and the rear wall portion 35d in the front-rear direction and connects the vehicle-width-direction outer ends to each other.

As illustrated in FIG. 2, an opening 36 is formed in the outer wall portion 35c of the center pillar 35 on the lower portion side thereof, and a reinforcement member 37 extending from the rear wall portion 35d to a rear rim portion of the opening 36 is provided in order to reinforce rigidity that decreases by forming the opening 36.

As illustrated in FIG. 2, a reinforcement member 40 that reinforces an upper portion of the center pillar 35 is provided on the upper portion side of the center pillar 35 in order to reinforce the upper portion side of the center pillar 35 of which length in the front-rear direction is relatively shorter than the length of the lower portion side thereof in the front-rear direction.

As illustrated in FIG. 2, the reinforcement member 40 includes a front edge portion 40a, a rear edge portion 40b spaced apart from the front edge portion 40a to the rear side, an upper portion connecting portion 40c extending upwards and connecting upper ends of the front edge portion 40a and the rear edge portion 40b to each other, and a lower portion connecting portion 40d extending in the front-rear direction and connecting lower ends of the front edge portion 40a and the rear edge portion 40b to each other. The reinforcement member 40 includes a downward extending portion 40e extending downward from a lower end of the rear edge portion 40b. The reinforcement member 40 is formed by integrally forming the components 40a to 40e.

The front edge portion 40a is formed to have an L-shaped cross-section and is joined to the front wall portion 35b and the outer wall portion 35c of the center pillar 35. The rear edge portion 40b is also formed to have an L-shaped cross-section and is joined to the rear wall portion 35d and the outer wall portion 35c of the center pillar 35. The upper portion connecting portion 40c is joined to at least the outer wall portion 35c of the center pillar 35. The lower portion connecting portion 40d is joined to the outer wall portion 35c of the center pillar 35. The downward extending portion 40e is formed to have an L-shaped cross-section and is joined to the rear wall portion 35d and the outer wall portion 35c of the center pillar 35.

Breakage is prevented by reinforcing an upper portion of the center pillar 35 of which width in the front-rear direction is short by the reinforcement member 40. By ending a lower end of the front edge portion 40a at the position of the lower portion connecting portion 40d, the rigidity is adjusted by both of the center pillar 35 and the reinforcement member 40. In other words, the proof stress against a side collision is adjusted. As illustrated in FIG. 2 and FIG. 3, a gusset member 41 serving as a load transmission member that protrudes to the door outer panel 31 side with respect to the outer wall portion 35c of the center pillar 35 from the rear wall portion 35d of the center pillar 35 is included.

As illustrated in FIG. 3 and FIG. 6, the gusset member 41 is obtained by integrally forming a receiving surface portion 41a for a side collision load along the door outer panel 31, a mounting portion 41b for the rear wall portion 35d of the center pillar 35, and a connecting portion 41c connecting both of the portions 41a and 41b to each other.

The gusset member 41 is disposed to be close to a lower portion of the center pillar 35, and a distal end side (a rear end side in this embodiment) of the gusset member 41 is set to be a free end. A urethane member 42 serving as an elastic member in abutment with the door outer panel 31 is provided on the receiving surface portion 41a of the gusset member 41.

By mounting the gusset member 41 having the receiving surface portion 41a for the side collision load on the rear wall portion 35d of the center pillar 35, the load is transmitted to the rear wall portion 35d of the center pillar 35 at the gusset member 41 at the time of a side collision. As a result, a behavior in which the front wall portion 35b of the center pillar 35 is greatly displaced to the vehicle-width-direction inner side with respect to the rear wall portion 35d due to the side collision load being slightly pressed against the front wall portion 35b of the center pillar 35 with respect to the rear wall portion 35d is suppressed.

In detail, the rear wall portion 35d of the center pillar 35 is pushed to the vehicle-width-direction inner side, and the rear wall portion 35d is dragged into the same direction via the mounting portion 41b of the gusset member 41 at the time of a side collision. As a result, the displacement of the front wall portion 35b to the vehicle-width-direction inner side is offset. In addition, a behavior in which the rear wall portion 35d of the center pillar 35 is displaced to the vehicle-width-direction inner side with respect to the front wall portion 35b is secured.

As illustrated in FIG. 6, a plurality of reinforcement beads 41d, 41e, and 41f are formed on the gusset member 41 along the extending direction of the gusset member 41. The reinforcement beads 41d and 41e out of the plurality of reinforcement beads 41d, 41e, and 41f protrude to the vehicle-width-direction inner side and are formed over the receiving surface portion 41a and the connecting portion 41c. The reinforcement bead 41f protrudes to the vehicle rear side and is formed over the entire length of the extending direction of the mounting portion 41b.

By the reinforcement beads 41d to 41f, the rigidity of the gusset member 41 in the extending direction thereof is increased. In addition, when load is transmitted to the rear wall portion 35d of the center pillar 35 via the gusset member 41 at the time of a side collision, the load transmission efficiency thereof is improved.

As illustrated in FIG. 2, regarding the relationship between the gusset member 41 and the reinforcement member 40, the downward extending portion 40e that is a rear end portion of the reinforcement member 40 extends downward to the position in which the gusset member 41 is disposed. As a result, the tension force against a lower portion of the rear door 30 by the gusset member 41 increases as the reinforcement member 40 is pushed to the indoor direction at the time of a side collision.

As illustrated in FIG. 2, a latch reinforcement 43 is provided on the front portion upper side of the door inner panel 32. The latch reinforcement 43 extends in the up-down direction from an upper end of the center pillar 35 to a portion directly above the gusset member 41 so as to correspond to the center pillar 35 as most parts thereof are illustrated in FIG. 2 with dotted lines. As illustrated in FIG. 2, FIG. 4, and FIG. 5, in upper end front portions of the latch reinforcement 43 and the door inner panel 32, a cutout portion 44 is formed so as to be continuous with both of the latch reinforcement 43 and the door inner panel 32.

As illustrated in FIG. 2, FIG. 4, and FIG. 5, in an upper end front portion of the center pillar 35, a cutout portion 45 of which cutout range is larger than that of the cutout portion 44 is formed. The cutout portion 45 is a cutout portion for mounting a die molding sealing member 46 (see FIG. 5) that performs corner sealing with the front door 10.

Even when the cutout portion 45 as above is formed, a case where the upper end front portion of the center pillar 35 slips through the cutout portion 45 to the indoor direction is suppressed by suppressing the abovementioned behavior of the center pillar 35 by the gusset member 41.

As illustrated in FIG. 1 to FIG. 5, the door inner panel 32 has a panel body 32a, a plurality of openings 32b, 32c, and 32d are formed in the panel body 32a, and an opening 47 for mounting side window glass is formed in the window frame portion 30S. In the drawings, arrow F indicates the vehicle front side, arrow R indicates the vehicle rear side, arrow IN indicates the vehicle-width-direction inner side, arrow OUT indicates the vehicle-width-direction outer side, and arrow UP indicates the vehicle upper side.

As described above, the side vehicle-body structure of the vehicle of the abovementioned embodiment is a side vehicle-body structure of a vehicle in which the center pillar does not exist on the body side, the side vehicle-body structure including the front door 10, the rear door 30 having a length in the front-rear direction shorter than the length of the front door 10 in the front-rear direction, the rear door 30 having the center pillar 35 on the door side built in the front portion thereof, and the gusset member 41 protruding from the rear wall portion 35d of the center pillar 35 to the door outer panel 31 side with respect to the outer wall portion 35c of the center pillar 35 and having the receiving surface portion 41a for the side collision load along the door outer panel 31 (see FIG. 1 to FIG. 3).

According to this configuration, the load can be transmitted to the rear wall portion 35d side of the center pillar 35 by the gusset member 41 at the time of a side collision. As a result, a behavior in which the front wall portion 35b of the center pillar 35 is greatly displaced to the vehicle-width-direction inner side with respect to the rear wall portion 35d of the center pillar 35 due to the side collision load being slightly pressed against the front wall portion 35b of the center pillar 35 with respect to the rear wall portion 35d of the center pillar 35 at the time of a side collision can be suppressed.

In one embodiment of the present disclosure, the center pillar 35 is formed such that the length of the upper portion side in the front-rear direction is shorter than the length of the lower portion side in the front-rear direction, the upper portion side has the reinforcement member 40 that reinforces the upper portion of the center pillar 35 provided thereon, the gusset member 41 is disposed to be close to the lower side of the center pillar 35, and the reinforcement member 40 has the rear end portion (see the downward extending portion 40e) extended downward to a place in which the gusset member 41 is disposed (see FIG. 2).

According to this configuration, the rear end portion of the reinforcement member 40 is extended downward to the place in which the gusset member 41 is disposed. This allows the tension force against the lower portion of the rear door 30 by the gusset member 41 to increase as the reinforcement member 40 is pushed to the indoor direction.

In one embodiment of the present disclosure, the cutout portion 45 for mounting the die molding sealing member 46 that performs corner sealing with the front door 10 is formed on the front portion of the upper end of the center pillar 35 (see FIG. 4 and FIG. 5).

According to this configuration, the abovementioned behavior is suppressed by the gusset member 41, and hence a case where the front portion of the upper end of the center pillar 35 slips through the cutout portion 45 to the indoor direction can be suppressed even when the cutout portion 45 is formed.

The strength of the upper end of the center pillar 35 decreases by the cutout portion 45, and hence the gusset member 41 can secure the behavior in which the rear wall portion 35d of the center pillar 35 is greatly displaced to the vehicle-width-direction inner side with respect to the front wall portion 35b of the center pillar 35 at the time of a side collision.

In one embodiment of the present disclosure, the gusset member 41 has a free end on a distal end side (see FIG. 3). According to this configuration, both of weight saving of the gusset member 41 and the reduction of the assembling time of the gusset member 41 can be performed.

In one embodiment of the present disclosure, the gusset member 41 has the reinforcement beads 41d, 41e, and 41f formed thereon along the extending direction of the gusset member 41 (see FIG. 6).

According to this configuration, the rigidity of the gusset member 41 in the extending direction thereof can be increased. In addition, when a load is transmitted to the rear wall portion 35d side of the center pillar 35 via the gusset member 41 at the time of a side collision, the load transmission efficiency thereof can be improved.

In one embodiment of the present disclosure, the receiving surface portion 41a of the gusset member 41 has the elastic member (see the urethane member 42) in abutment with the outer panel 31 of the rear door 30 provided thereon (see FIG. 3). According to this configuration, the tensile rigidity of the outer panel 31 of the rear door 30 can be secured.

Regarding the correspondence between the configuration of the present disclosure and the abovementioned embodiment, the rear door outer panel of the present disclosure corresponds to the door outer panel 31 of the embodiment. Similarly, the elastic member corresponds to the urethane member 42. However, the present disclosure is not limited to the configuration of the abovementioned embodiment.

For example, the side vehicle-body structure of the vehicle including the doors in the form of a clamshell door structure has been exemplified in the abovementioned embodiment, but a vehicle in which the rear door is a slide door is also possible as long as the vehicle is a vehicle in which the center pillar does not exist on the body side.

As described above, the present disclosure is useful for a side vehicle-body structure of a vehicle in which a center pillar connecting a roof side rail portion and a side sill portion to each other in the up-down direction does not exist on the body side.

What is claimed is:

1. A side vehicle-body structure of a vehicle in which a center pillar does not exist on a body side, the side vehicle-body structure comprising:
 a front door;
 a rear door having a length in a front-rear direction shorter than a length of the front door in the front-rear direction, the rear door having a center pillar on a door side built in a front portion thereof; and
 a gusset member protruding from a rear side wall portion of the center pillar to a rear door outer panel side with respect to an outer side wall portion of the center pillar, and having a receiving surface portion for a side collision load along the rear door outer panel,
 wherein
 the center pillar is formed such that a length of an upper portion side in the front-rear direction is shorter than a length of a lower portion side in the front-rear direction,
 the upper portion side has a reinforcement member that reinforces an upper portion of the center pillar provided thereon,
 the gusset member is disposed to be close to a lower side of the center pillar, and
 the reinforcement member has a rear end portion extended downward to a place in which the gusset member is disposed.

2. The side vehicle-body structure of the vehicle according to claim 1, wherein a cutout portion for mounting a die molding sealing member that performs corner sealing with the front door is formed on a front portion of an upper end of the center pillar.

3. The side vehicle-body structure of the vehicle according to claim 2, wherein
 the gusset member has a free end on a distal end side from the center pillar.

4. The side vehicle-body structure of the vehicle according to claim 3, wherein
 the gusset member has a reinforcement bead formed thereon along an extending direction of the gusset member.

5. The side vehicle-body structure of the vehicle according to claim 4, wherein
 the receiving surface portion of the gusset member has an elastic member in abutment with an outer panel of the rear door provided thereon.

6. A side vehicle-body structure of a vehicle in which a center pillar does not exist on a body side, the side vehicle-body structure comprising:
- a front door;
- a rear door having a length in a front-rear direction shorter than a length of the front door in the front-rear direction, the rear door having a center pillar on a door side built in a front portion thereof; and
- a gusset member protruding from a rear side wall portion of the center pillar to a rear door outer panel side with respect to an outer side wall portion of the center pillar, and having a receiving surface portion for a side collision load along the rear door outer panel, wherein
- the gusset member has a free end on a distal end side from the center pillar, and
- the gusset member is disposed to be close to a lower side of the center pillar.

7. The side vehicle-body structure of the vehicle according to claim 1, wherein
the gusset member has a reinforcement bead formed thereon along an extending direction of the gusset member.

8. The side vehicle-body structure of the vehicle according to claim 1, wherein
the receiving surface portion of the gusset member has an elastic member in abutment with an outer panel of the rear door provided thereon.

9. The side vehicle-body structure of the vehicle according to claim 1, wherein
the gusset member has a free end on a distal end side from the center pillar.

10. The side vehicle-body structure of the vehicle according to claim 1, wherein
the receiving surface portion of the gusset member has an elastic member in abutment with an outer panel of the rear door provided thereon.

11. The side vehicle-body structure of the vehicle according to claim 2, wherein
the gusset member has a reinforcement bead formed thereon along an extending direction of the gusset member.

12. The side vehicle-body structure of the vehicle according to claim 2, wherein
the receiving surface portion of the gusset member has an elastic member in abutment with an outer panel of the rear door provided thereon.

13. The side vehicle-body structure of the vehicle according to claim 3, wherein
the receiving surface portion of the gusset member has an elastic member in abutment with an outer panel of the rear door provided thereon.

14. The side vehicle-body structure of the vehicle according to claim 6, wherein
the gusset member has a reinforcement bead formed thereon along an extending direction of the gusset member.

15. The side vehicle-body structure of the vehicle according to claim 6, wherein
the receiving surface portion of the gusset member has an elastic member in abutment with an outer panel of the rear door provided thereon.

16. The side vehicle-body structure of the vehicle according to claim 7, wherein
the receiving surface portion of the gusset member has an elastic member in abutment with an outer panel of the rear door provided thereon.

17. The side vehicle-body structure of the vehicle according to claim 9, wherein
the gusset member has a reinforcement bead formed thereon along an extending direction of the gusset member.

18. The side vehicle-body structure of the vehicle according to claim 9, wherein
the receiving surface portion of the gusset member has an elastic member in abutment with an outer panel of the rear door provided thereon.

* * * * *